(12) United States Patent
Chitloor et al.

(10) Patent No.: US 11,734,124 B2
(45) Date of Patent: *Aug. 22, 2023

(54) RULE-BASED RE-TIERING OF INCREMENTAL BACKUP DATA STORED ON A CLOUD-BASED OBJECT STORAGE

(71) Applicant: EMC IP Holding Company LLC, Hopkinton, MA (US)

(72) Inventors: Ravi Vijayakumar Chitloor, Bengaluru (IN); Sunil Yadav, Bangalore (IN); Shelesh Chopra, Bangalore (IN); Amarendra Behera, Bangalore (IN); Tushar Dethe, Bangalore (IN); Deependra Singh, Kanpur (IN); Prabhat Kumar Dubey, Chikkanagamangala (IN); Himanshu Arora, Bangalore (IN); Jigar Bhanushali, Valsad (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 113 days.

This patent is subject to a terminal disclaimer.

(21) Appl. No.: 17/208,815

(22) Filed: Mar. 22, 2021

(65) Prior Publication Data

US 2022/0229733 A1 Jul. 21, 2022

Related U.S. Application Data

(63) Continuation-in-part of application No. 17/150,077, filed on Jan. 15, 2021.

(51) Int. Cl.
*G06F 11/14* (2006.01)

(52) U.S. Cl.
CPC ...... *G06F 11/1451* (2013.01); *G06F 11/1464* (2013.01); *G06F 11/1469* (2013.01); *G06F 2201/84* (2013.01)

(58) Field of Classification Search
CPC ............. G06F 11/1451; G06F 11/1464; G06F 11/1469; G06F 2201/84
See application file for complete search history.

(56) References Cited

U.S. PATENT DOCUMENTS 7,197,520 B1 * 3/2007 Matthews ........... G06F 11/1458
9,430,332 B1 * 8/2016 Bahadure ................ G06F 16/27
(Continued)

*Primary Examiner* — Alford W Kindred
*Assistant Examiner* — Tiffany Thuy Bui
(74) *Attorney, Agent, or Firm* — Dergosits & Noah LLP; Todd A. Noah

(57) ABSTRACT

Described is a system for rule-based re-tiering of backup data stored on a cloud-based object storage. More specifically, the system may re-tier objects based on one or more storage rules such that the system retains the ability to efficiently perform a full restore of backup data even when incremental backups are performed to a cloud-based object storage. To provide such a capability, the system may maintain a specialized metadata database that stores information indicating the backup time for each backup, and a list of objects required to perform a full restore to each of the backup times. Accordingly, when initiating a re-tiering based on one or more storage rules, the system may intelligently select candidate objects for re-tiering by leveraging the metadata database to ensure that objects that may still need to be referenced are not unnecessarily moved to a lower storage tier.

20 Claims, 5 Drawing Sheets

(56) References Cited

U.S. PATENT DOCUMENTS

| | | | | |
|---|---|---|---|---|
| 9,563,628 | B1* | 2/2017 | MacNeill | G06F 11/16 |
| 10,372,547 | B1* | 8/2019 | Zhu | G06F 3/067 |
| 11,340,824 | B1* | 5/2022 | Yadav | G06F 3/0619 |
| 2005/0246398 | A1* | 11/2005 | Barzilai | G06F 11/1448 |
| 2007/0185934 | A1* | 8/2007 | Cannon | G06F 11/1448 |
| | | | | 714/E11.122 |
| 2012/0078855 | A1* | 3/2012 | Beatty | G06F 11/1451 |
| | | | | 707/E17.007 |
| 2014/0059311 | A1* | 2/2014 | Oberhofer | G06F 3/0617 |
| | | | | 711/162 |
| 2016/0162366 | A1* | 6/2016 | Oberhofer | G06F 16/17 |
| | | | | 707/645 |
| 2016/0378616 | A1* | 12/2016 | Wigmore | G06F 11/1469 |
| | | | | 711/162 |
| 2020/0327017 | A1* | 10/2020 | Vijayan | G06F 11/1451 |
| 2021/0132830 | A1* | 5/2021 | Dalmatov | G06F 16/172 |
| 2021/0263666 | A1* | 8/2021 | Yung | G06F 11/1464 |
| 2022/0092022 | A1* | 3/2022 | Agarwal | G06F 16/113 |

* cited by examiner

400

| 401 | PERFORM A SET OF BACKUPS OF CLIENT DATA STORED ON A CLIENT DEVICE TO A CLOUD-BASED OBJECT STORAGE, THE SET OF BACKUPS OF THE CLIENT DATA STORED AS OBJECTS WITHIN A FIRST STORAGE TIER OF THE OBJECT STORAGE |

↓

| 402 | STORE, AS PART OF A METADATA DATABASE, A POINT-IN-TIME FOR EACH BACKUP OF THE SET OF BACKUPS, AND A LIST OF OBJECTS REFERENCED BY EACH BACKUP OF THE SET OF BACKUPS |

↓

| 403 | DETECT THAT AN AMOUNT OF STORAGE USED BY THE OBJECTS WITHIN THE FIRST STORAGE TIER EXCEEDS A STORAGE LIMIT |

↓

| 404 | DETERMINE A NUMBER OF THE OBJECTS TO RE-TIER TO A SECOND STORAGE TIER BASED ON THE AMOUNT OF STORAGE THAT EXCEEDS THE STORAGE LIMIT |

↓

| 405 | SELECT A THRESHOLD TIME BASED ON THE NUMBER OF THE OBJECTS TO RE-TIER |

↓

| 406 | IDENTIFY, AMONGST THE OBJECTS STORED BY THE OBJECT STORAGE, A FIRST SET OF OBJECTS NOT REFERENCED BY A FIRST SET OF BACKUPS, AMONGST THE SET OF BACKUPS, PERFORMED ON OR AFTER THE THRESHOLD TIME |

↓

| 407 | INITIATE A RE-TIERING BY MOVING THE FIRST SET OF OBJECTS FROM THE FIRST STORAGE TIER TO THE SECOND STORAGE TIER OF THE OBJECT STORAGE |

FIG. 4

RULE-BASED RE-TIERING OF INCREMENTAL BACKUP DATA STORED ON A CLOUD-BASED OBJECT STORAGE

CROSS REFERENCE TO RELATED APPLICATIONS

This application is a Continuation-in-Part of U.S. patent application Ser. No. 17/150,077, filed on Jan. 15, 2021, which is incorporated by reference herein in its entirety.

TECHNICAL FIELD

This disclosure relates to cloud-based storage systems, and more particularly, managing backup data stored on a cloud-based object storage.

BACKGROUND

Cloud-based storage systems (or on-demand storage systems) may provide various tools that are crucial for enterprise level network clients. For example, clients may rely on such systems for data protection and recovery services that efficiently back up and recover data in the event of data loss to allow business applications to remain in service or quickly come back up to service. Clients may rely on such cloud-based storages to leverage the benefits such as cost efficiency (e.g. pay per usage models) and scalability. These cloud-based systems may implement an object-based storage architecture, and accordingly, client data such as backup data may be stored as objects (or data objects). To limit the amount of data transferred during a backup procedure, the client data may be stored to an object storage using incremental backups. For example, only the changes to the client data since the previous backup will be stored as part of the incremental backup. Accordingly, large amounts of data from previous backups may need to be preserved on the object storage in order to perform a full data recovery. The need to store such large amounts of data, however, results in increased storage costs. Although cloud storage providers provide the ability to store data on different storage tiers with varying associated costs, the native capabilities (or tools) provided by object storages to allocate data to the different storage tiers are often rudimentary. Moreover, such native capabilities may not adequately address data being stored as part of an incremental backup infrastructure. Accordingly, there is a continued need to efficiently allocate data to various storage tiers when storing backup data to a cloud-based object storage.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIG. 4 is a flow diagram illustrating an example method of re-tiering objects within an object storage according to one or more embodiments of the disclosure.

DETAILED DESCRIPTION

Figure 1:
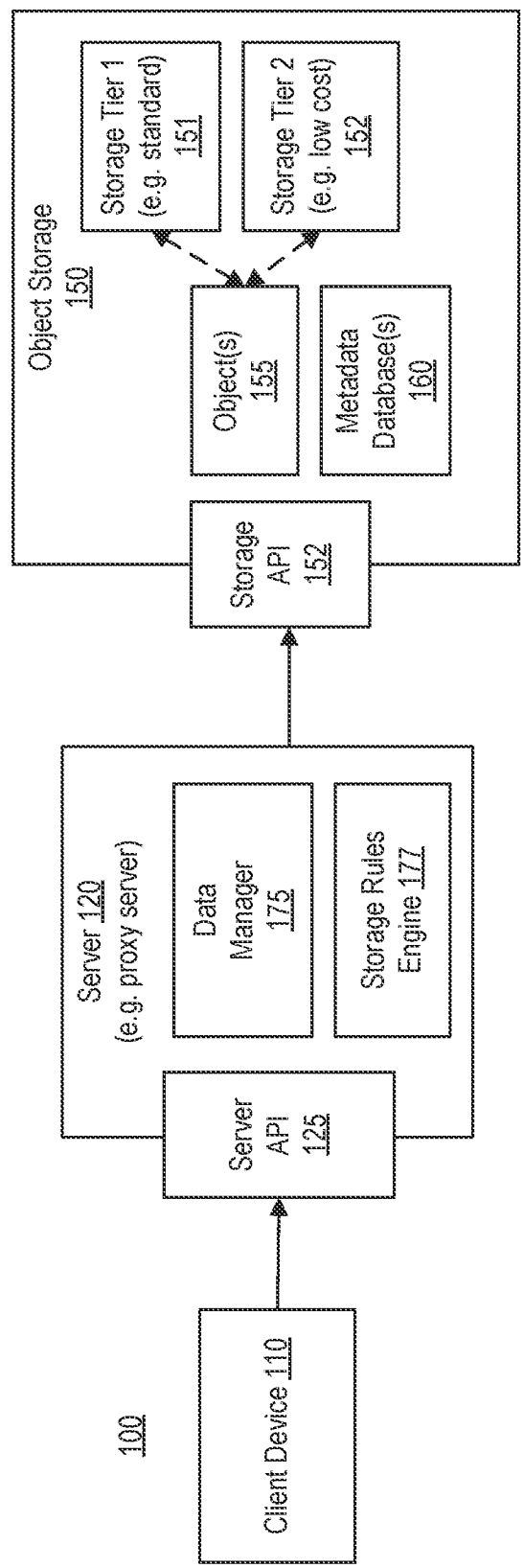
FIG. 1 is a block diagram illustrating an example of an operating environment that may be used in conjunction with one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for rule-based re-tiering of backup data stored on a cloud-based object storage. The system may perform a specialized process to re-tier objects stored within an object storage when certain storage conditions are present while still preserving efficient backup storage techniques. For example, in order to conserve storage space, a backup service may perform incremental backups when storing client backup data to the object storage. However, the backup application may perform a full restore of the client data to a point-in-time of any incremental backup by reconstructing (e.g. synthetically) the client data as if a full backup was performed. Accordingly, the system may intelligently re-tier objects when certain storage conditions are detected such that the system retains the ability to perform such a reconstruction. Cloud-based object storages may provide native capabilities to re-tier objects based on an expiration. However, instead of merely re-tiering objects exclusively on an expiration, the system may initiate a re-tiering of objects when storage conditions dictate and based on whether the objects are still referenced such that they are required to perform a full restore.

To provide such a capability, the system may monitor storage conditions within the cloud-based object storage. For example, a client storing data on the cloud-based objects storage may employ a storage policy that includes storage rules that specify when backed-up client data should be moved from a default (or standard) storage tier to a lower cost storage tier. For instance, the storage policy may be customized to reduce storage costs without unduly hindering storage performance. When performing a re-tiering, the system may identify a threshold time that delineates backups such that objects stored as part of backups stored before the point-in-time may be potential candidates for re-tiering. However, the server may perform an intelligent selection such that objects that are still referenced by backups performed after the point-in-time are not re-tiered in order to preserve recovery performance. When identifying a threshold time, the server may perform various determinations (or heuristics) to approximate the amount of data to be re-tiered such that a near optimal amount of data remains on the default storage tier.

As described, when performing a re-tiering, the system may preserve storage and recovery performance by ensuring that data that is still referenced by an incremental backup is not prematurely re-tiered to a lower storage tier. To identify such data, the system may maintain a specialized metadata database. The metadata database may include a backup catalog that stores information indicating the backup time for each backup, and a list of objects required to perform a full restore to each of the backup times. Accordingly, when using a threshold time to select candidate objects for re-tiering, the system may leverage the metadata database to ensure that objects that may still need to be referenced are not unnecessarily moved to a lower storage tier. Accordingly, the system provides a layer of intelligence when re-tiering data while at the same time preserving efficient storage techniques for backup data.

As referred to herein, a "threshold time" (or cut-off time, delineation time, etc.) may include a point-in-time that is used to delineate between objects (or backups) that may be re-tiered to a lower cost storage tier. For example, objects that were stored before (or older than) the threshold time may be identified (or marked, tagged, etc.) as candidates to be moved to a lower cost storage tier. In some embodiments, the threshold time may correspond to a point-in-time in which the benefits of efficient recovery (or access) to applicable objects do not outweigh the storage costs associated with continued storage of objects on a certain storage tier. As a result, objects that were stored before (or older than) the threshold time may be moved to a lower cost storage tier without adversely hindering the overall backup and recovery performance of a backup service.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g. Solid State Drive (SSD), Hard Disk Drive (HDD)), which may include storage systems provided by a cloud service provider.

More specifically, and with reference to FIG. 1, shown is a block diagram illustrating an example of an operating environment 100 for managing backup data on an object storage according to one or more embodiments of the disclosure. It should be noted that the components of operating environment 100 may interact via a network, which may be any type of wired or wireless network including a local area network (LAN), a wide area network (WAN), or a direct communication link, or other suitable connection.

As shown, the environment 100 may include a client device 110, a server (e.g. a cloud-based component/gateway and/or a proxy server) 120, and a cloud-based (or on-demand) object storage 150. In general, the server 120 may act as an intermediary between the client device 110 and the object storage 150. In some embodiments, the client device 110 may be associated with a client that is a customer (or subscriber, client, tenant, user, account, etc.) of a backup service or platform (e.g. software/platform-as-a-service) provided by a first entity, as well as a customer of an object storage or service (e.g. software/platform-as-a-service) provided by a different (or second) entity. For example, the server 120 may be provided as part of the backup service provided by the first entity (e.g. Dell EMC), and the object storage 150 may be provided as part of a cloud-based object storage service provided by the different entity (e.g. Amazon S3, Microsoft Azure, IBM Cloud Object Storage, Google Cloud Storage, etc.). In some embodiments, the first entity providing the backup service may also provide (or host) the client device 110 (e.g. as part of a VM).

The client device (or client system) 110 may be associated with client data (or data) that is backed up to the object storage 150. The object storage (or object storage system) 150 may include a persistent object storage that implements a storage architecture that manages data as an object(s) 155. For example, each object 155 stored by the object storage 150 may include data, meta-data, and/or a globally unique identifier for the object. In some embodiments, an object may include a unit of storage used by a cloud-based object storage and may include a collection of objects that may be referred to as containers, buckets, and the like (e.g. depending on the cloud-based storage provider). As shown, the object storage 150 may include various storage tiers including storage tier 1 151, and storage tier 2 152. Accordingly, objects 155 (e.g. backed up client data) may be distributed amongst these storage tiers (or classes). For example, each storage tier may have different performance characteristics such as latency, storage capacity, bandwidth, durability, etc., and thus, may be associated with different storage costs. For example, the storage cost may include a time-based cost per unit of storage (e.g. GB/month), retrieval costs, performance costs, etc. For instance, higher performance tiers may be associated with increased costs. For example, storage tier 1 151 may be a standard (or high performance) storage tier that is associated with a first storage cost (or cost per unit of storage), and storage tier 2 152 may be an archival or low-cost storage tier that is associated with a second storage cost (or cost per unit of storage). For example, the storage cost (e.g. GB/month) associated with storage tier 2 152 may be lower than the storage cost associated with storage tier 1 151. Thus, efficiently storing data on a lower tier storage may provide substantial cost savings to a subscriber (e.g. a backup service provider, or user) of the cloud-based storage service. For example, storage tier 1 151 may have a cost of 2.3 cents (or $0.023) per GB/month, while storage tier 2 152 may have a cost of 0.4 cents (or $0.004) per GB/month. Accordingly, re-tiering data to storage tier 2 152 would result in a significant reduction in storage costs. It should be noted that other storage costs (or fees) such as access fees or bandwidth fees may also be reduced using a lower cost storage tier. In addition, although only two storage tiers are shown, additional storage tiers with varying costs are also contemplated.

The client device 110 may use the server 120 as an intermediary for managing client backup data stored on the object storage 150. In some embodiments, the server 120 may include, or work in conjunction with, various backup components (e.g. products) that can perform backup operations across physical and virtual environments. These backup components (e.g. backup application, backup appliance, backup server, etc.) can be implemented in various forms, such as a virtual, physical, or native public cloud appliance to fit the requirements of a particular configuration, and can be used with various types of data protection environments, including public and private object storage clouds. The server 120 may also provide enhanced security by being a single secure point of access to data stored externally on the object storage 150. For example, a client device 110 may implement a certain network configuration (e.g. firewall) that limits external access to the client environment. Such a network configuration may be customized to authorize external access to the client device 110 only by the server 120 and not the object storage 150 directly. In addition, the server 120 may also allow the client device 110 to offload resource intensive data management processing. For example, the server 120 may handle backup-related data processing before storing data into the object storage 150. Accordingly, the server 120 may provide advantages over traditional proxy servers that merely forward data to the object storage 150. In addition, the server 120 may be an application or hardware component remote from the client device 110 (e.g. as part of a cloud-based service). Accordingly, the server 120 may be scalable such that it may perform data operations in parallel for multiple client devices 110 and for multiple object storages 150.

As described, the server 120 may act as an intermediary for communications between the client device 110 and an object storage 150. For example, these communications may include requests by the client device 110 to perform data operations on the object storage 150, which are routed through the server 120. For example, the client device 110 may provide (or send, transmit, etc.) client data (or data) to the server 120 using a server API 125. The server 120 may then initiate (or perform, execute, etc.) a corresponding storage operation directly on the object storage using the storage API 152. In some embodiments, the server API 125 may be a REST API that includes a common set of operations that correspond to various data-related operations on the object storage 150. For example, the server API 125 may include operations allowing a client device 110 to store and recover client data backed up to the object storage 150. For example, the server API 125 may allow the client device 110 to read data from an object storage 150, write data to an object storage 150, copy data within the object storage 150, and various other operations for managing data. In some embodiments, the server API 125 may include operations for re-tiering data (e.g. objects) stored on the object storage 150. For example, a re-tiering operation may move an object from a first storage tier (e.g. storage tier 1 151) to a second (or lower) storage tier (e.g. storage tier 2 152). It should be noted that the same set of operations provided by the server API 125 may be used by the client device 110 irrespective of the type of object storage 150. To provide such object-storage-agnostic functionality, the server 120 may include a function library that includes object-storage-specific functions. Accordingly, the server 120 may use such object-storage-specific functions to interact directly with the object storage 150. For example, the server 120 may initiate data operations directly on the object storage 150 by calling various methods (functions, operations, etc.) of the storage API 152. In some embodiments, the storage API 152 may include only a standard set of storage operations. Accordingly, the server 120 may implement efficient storage and recovery procedures as further described herein.

As described, the server 120 may manage backed up client data stored on the object storage 150. Accordingly, the server 120 may include a data manager 175. The data manager (or manager) 175 may coordinate (or manage, orchestrate, execute, automate, etc.) the initiation (or execution) of storage and recovery operations on the object storage 150. In some embodiments, the data manager 175 may provide a user interface that allows a user to perform and configure various settings associated with managing backup data. For example, the user interface may allow a user to configure (e.g. input) various settings such as backup rules (e.g. storage limits, storage cost limits, storage ratios, etc.) associated with re-tiering data stored on the object storage 150 as further described herein. In addition, the data manager 175 may direct (or control, initiate, etc.) other components of the operating environment 100 to perform various processes as further described herein.

The server 120 may also include a storage rules engine 177 (or manager, component, etc.). The storage rules engine (or rules engine) 177 may work in conjunction with, or be part of, the data manager 175. The rules engine 177 may monitor storage characteristics of the backed-up client data stored on the object storage 150. For example, the rules engine 177 may detect when one or more storage rules relating to the amount of data stored on the object storage 150, or an associated cost, reaches a predefined limit. When such a limit is detecting, the server 120 may initiate a re-tiering of data (e.g. objects) as further described herein.

To further improve potential storage and recovery efficiency, the server 120 may leverage a specialized metadata database 160. The metadata database 160 may be maintained by the server 120. The metadata database 160 may include an embedded database. For example, the metadata database 160 may be created by the server 120 using a particular software library (e.g. SQLite library). The metadata database 160 may reside on the object storage 150, the server 120, and/or another component (e.g. cloud-based component) such that it is accessible by the server 120. For example, when the metadata database 160 resides on the object storage 150, the server 120 may access (e.g. update) the metadata database 160 by accessing the storage API 152.

The metadata database 160 may store metadata associated with client data stored on the client device 110 and/or backed up to the object storage 150. The metadata database 160 may also store various types of backup information associated with the backed-up client data. For example, the metadata database 160 may include a backup catalog that stores information for each backup performed to the object storage 150. For example, the backup catalog may include backup times specifying when each backup was performed. In addition, the backup catalog may include a list of objects required to perform a full restore to each of the backup times. Accordingly, the metadata database 160, and more particularly, the metadata stored therein, may be leveraged by the server 120 when re-tiering data in an efficient manner as further described herein.

Figure 2:
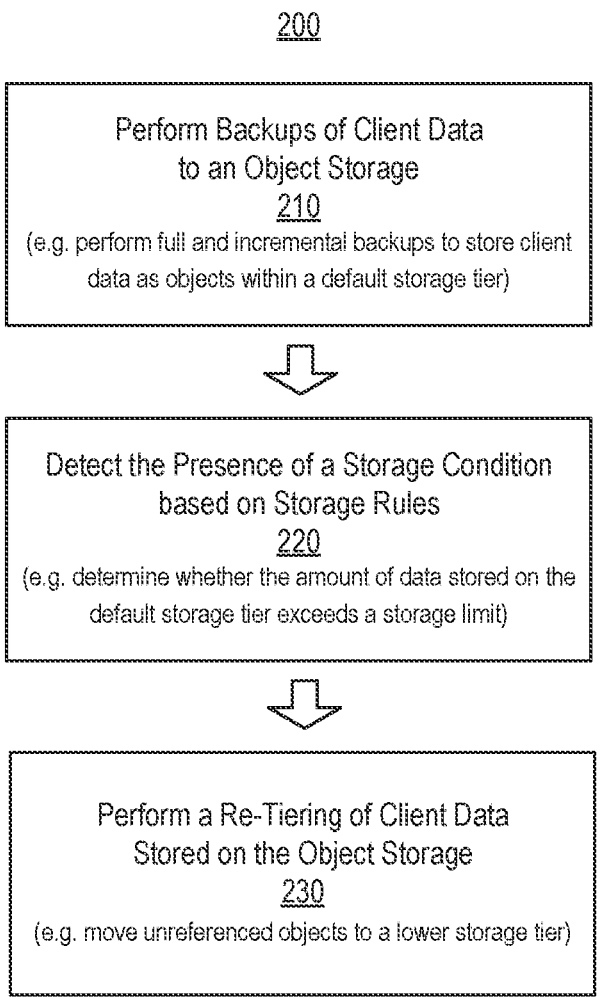
FIG. 2 is a process flow diagram illustrating an overview for rule-based re-tiering of data stored on an object storage according to one or more embodiments of the disclosure.

FIG. 2 is a process flow diagram 200 illustrating an overview for rule-based re-tiering of data stored on an object storage according to one or more embodiments of the disclosure.

In 210, the server (e.g. server 120) may perform backups of client data stored on a client device (e.g. client device 110) to an object storage (e.g. object storage 150). The server may perform backups of client data in response to receiving a request to perform a backup of the client data. For example, the request may be from a user (e.g. backup administrator) or from a backup application (e.g. as part of a scheduled backup procedure). When performing a backup, the server may store a backup of the client data on the object storage as one or more objects (e.g. objects 155). When storing these objects, the server may store the objects within a default storage tier (e.g. storage tier 1 151) of the object storage. The server may also store specialized metadata associated with the performed backup and/or client data within a metadata database (e.g. metadata database 160). When performing a backup, the server may perform either a full backup or an incremental backup. A full backup may include the server storing all of the client data at a particular point-in-time to the object storage. For example, the system may determine that the client data has not been previously backed up, and accordingly, may initiate the full backup. As another example, the server may determine that a full backup, to be performed intermittently between incremental backups, is scheduled to be performed. An incremental backup (also referred to as a differential incremental backup) may include storing only the changes to the client data since the previous backup. For example, the server may determine the changes (or delta) to client data between the point-in-time of the previous backup (e.g. full or incremental backup) and the point-in-time of the current backup. As part of the incremental backup, the server may store the new data within one or more new objects on the object storage and retain the previously backed up data within the objects already stored on the object storage. In addition, as part of the incremental backup, the server may store metadata associated with the backup and/or new data within the metadata database.

As described, the server may monitor storage conditions associated with the object storage. Accordingly, in 220, the server may detect the presence of a storage condition based on one or more storage rules. The storage condition may include determining that the amount of data stored on the default storage tier has exceeded (or reached) a predefined limit. The limit may be based on an absolute amount of data stored on the default storage tier (e.g. total GB s of data stored within the default storage tier at a particular point-in-time), the amount of data stored on the default storage relative to one or more lower storage tiers (e.g. ratio of data stored on the default tier versus one or more lower storage tiers at a particular point-in-time), a storage cost incurred for storing the amount data on the default storage tier (e.g. a cost to continue to store the amount of data within the default storage tier), or any other conditions that may be associated with allocating data between a default storage tier and one or more lower storage tiers.

As part of the overall data management infrastructure, the server may reduce storage costs by leveraging various storage tiers provided by an object storage. Accordingly, in 230, the server may perform a re-tiering of client data stored on the object storage. In particular, the server may move particular objects stored within the default (or standard) storage tier (e.g. higher cost storage tier) to a lower storage tier (e.g. lower cost storage tier). When performing a re-tiering, the server may identify a threshold time that delineates backups such that objects stored as part of backups stored before the point-in-time may be potential candidates for re-tiering. However, as described, the server may perform an intelligent selection such that objects that are still referenced by backups performed after the point-in-time are not re-tiered in order to preserve recovery performance. When identifying a threshold time, the server may perform various determinations (or heuristics) to approximate the amount of data to be re-tiered such that the amount of data stored within the default storage tier falls below the predefined limit. In other words, in some embodiments, the server may identify the threshold time to maintain a near optimal amount of data on the default storage tier according to the storage rules.

Accordingly, when performing a re-tiering, the server may identify particular objects in a specialized manner as further described with reference to FIG. 3.

Figure 3:
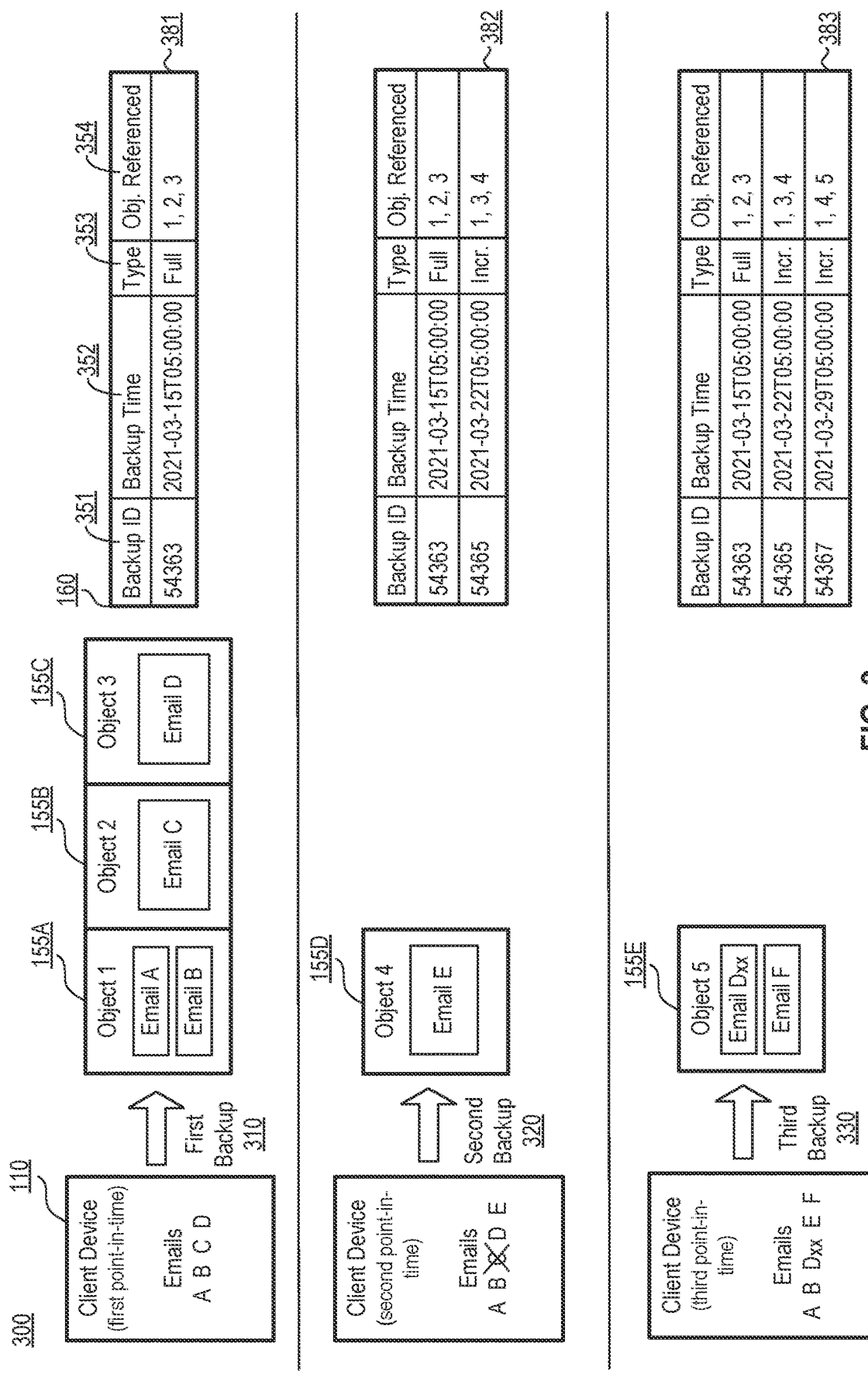
FIG. 3 is a diagram illustrating an example data configuration when re-tiering data according to one or more embodiments of the disclosure.

FIG. 3 is a diagram 300 illustrating a data configuration including storing data within one or more objects 155 and a metadata database 160 according to one or more embodiments of the disclosure. In this example, the client data includes emails although any type of data is contemplated. As shown, the client device 110 at a first point-in-time stores emails A, B, C, and D. Accordingly, as part of the first backup 310, which in this example is a full backup, the server stores the emails within newly created objects 155A, 155B, and 155C of the object storage. In other words, objects 155A, 155B, and 155C may be associated with the first backup 310 and/or the first point-in-time. In some embodiments, each object 155 may be configured to store a certain amount of data that is specialized for the type of data to be backed up. For example, each of the objects 155 may be configured to store an amount of data that is specialized for client emails (e.g. approximately 4 MB). Accordingly, to efficiently utilize storage space on the object storage, the server may perform a packing (or grouping, combining, etc.) of data based on the amount of data an object 155 is configured to store. Thus, in this example, the server may attempt to pack emails into each of the objects 155 such that each object stores approximately 4 MB of data. For example, the server may store (e.g. pack) emails A and B, which are approximately 2 MB each in size, within object 155A, and emails C and D, which are approximately 4 MB each in size, within objects 155B and object 155C respectively.

Additionally, as shown, the server may store metadata associated with each backup within the metadata database 160. For example, the metadata database 160 may include a backup catalog (or index, table, etc.). For example, the backup catalog may be in the form of a table and may store an entry for each backup performed, although any structure or configuration is contemplated. As shown in this example, the metadata database 160 (e.g. backup catalog) may include a backup identifier (ID) 351, a backup time 352, backup type 353, and a referenced object list 354. The backup ID 351 may uniquely identify the performed backup. The backup time 352 may be a time associated with the performed backup. For example, the backup time 352 may be a point-in-time of when the backup was performed. The backup type 353 may indicate whether the backup performed was a full or incremental backup. The referenced object list 354 may include a list of objects referenced by a particular backup. For example, the objects referenced by a particular backup indicate which objects are required to perform a full restore (or recovery) to the point-in-time of the corresponding backup. For example, the server may update the metadata database 160, and in particular a backup catalog, in response to each backup performed. Accordingly, this backup catalog may be leveraged by the server when performing an intelligent re-tiering as further described herein.

More specifically, as shown in this example, in response to performing the first backup 310, the server may update the metadata database 160 to include (or add, create, etc.) entry 381, which is associated with the first backup 310. As shown, entry 381 includes a unique identifier "54363" as the backup ID 351, "2021-03-15T05:00:00" as the backup time 352, a full backup as the type of backup 353, and objects 1, 2, and 3 (e.g. objects 155A, 155B, and 155C) as the referenced object list 354 for the corresponding backup (e.g. first backup 310). In other words, to perform a full restore (or recovery) of the client data to the point-in-time associated with the first backup 310 (e.g. restoration of emails A, B, C, and D), the referenced object list 354 indicates that the server would need to retrieve the data stored in objects 155A, 155B, and 155C.

After the first backup 310, the server may perform a second backup 320. In this example, since the first point-in-time, the changes to the emails stored by the client device 110 include the deletion of email C, and the addition of new email E. Accordingly, the client device 110 at a second point-in-time stores emails A, B, D, and new email E. Thus, as part of the second backup 320, which in this example is an incremental backup, the server may store only new email E within a newly created object 4 155D. As shown, object 4 155D only stores email E, and the previously backed up emails (e.g. emails A-D) are retained in objects 155A, 155B, and 155C. In other words, the data of objects 155A, 155B, and 155C are not copied to additional objects (e.g. object 4 155D) as part of the second backup 320. Instead, when a full restore (or recovery) to the second point-in-time is required, the server may combine the data of the referenced objects to create a complete dataset (e.g. emails A, B, D, and E).

In response to performing the second backup 320, the server may update the metadata database 160 to include entry 382, which is associated with the second backup 320. As shown, entry 382 includes a unique identifier "54365" as the backup ID 351, "2021-03-22T05:00:00" as the backup time 352, an incremental backup as the type of backup 353, and objects 1, 3, and 4 (e.g. objects 155A, 155C, and 155D) as the referenced object list 354 for the corresponding backup (e.g. second backup 320). In other words, to perform a full restore of the client data to the point-in-time associated with the second backup 320 (e.g. restoration of emails A, B, D, and E), the referenced object list 354 indicates that the server would need to retrieve the data stored in objects 155A, 155C, and 155D.

After the second backup 320, the server may perform a third backup 330. In this example, since the second point-in-time, the changes to the emails stored by the client device 110 include the modification of email D, and the addition of new email F. Accordingly, the client device 110 at a third point-in-time stores emails A, B, modified email D, E, and new email F. Thus, as part of the third backup 330, which is also an incremental backup, the server may store modified email D and new email F within a newly created object 5 155E. As shown, object 5 155E only stores modified email D and new email F, and the previously backed up emails (e.g. emails A-E) are retained in objects 155A-D. In other words, the data of objects 155A-D are not copied to additional objects (e.g. object 5 155E) as part of the third backup 330. Instead, when a full restore (or recovery) to the third point-in-time is required, the server may combine the data of the referenced objects to create a complete dataset (e.g. emails A, B, D (as modified), E, and F).

In response to performing the third backup 330, the server may update the metadata database to include entry 383. As shown, entry 383 includes a unique identifier "54367" as the backup ID 351, "2021-03-29T05:00:00" as the backup time 352, an incremental backup as the type of backup 353, and objects 1, 4, and 5 (e.g. objects 155A, 155D, and 155E) as the referenced object list 354 for the corresponding backup (e.g. third backup 330). In other words, to perform a full restore of the client data to the point-in-time associated with the third backup 330 (e.g. restoration of emails A, B, D (as modified), E, and F), the referenced object list 354 indicates that the server would need to retrieve the data stored in objects 155A, 155D, and 155E.

In the above example, the server may initially store objects 1-5 (e.g. objects 155A-E) in a default (or standard) storage tier. However, as described, the server may also initiate a re-tiering of these objects when certain storage conditions are detected. These storage conditions may be based on one or more storage rules. For example, a storage rule may include re-tiering objects after an amount of storage used by objects within the standard storage tier exceeds (or reaches) a predefined limit. By way of example, the predefined limit may include a ratio (or allocation) such as maintaining 40% of the backup data on the default storage tier and 60% of backup data on one or more lower storage tiers. Accordingly, using the example in diagram 300, prior to the first backup 310, the backup data allocation ratio may satisfy the 40/60 storage ratio rule. However, after the third backup 330, the ratio may be skewed in response to adding new objects 4, and 5 (e.g. objects 155D, and 155E) to the default storage tier. Accordingly, upon detection of the ratio exceeding the predefined limit, the server may determine an amount of data to re-tier. In some embodiments, this may include approximating a number of objects to re-tier such that the ratio returns to an acceptable level. It should be noted that the server may attempt to find a near optimal amount of data to re-tier and retain the 40/60 ratio to maintain a certain amount of storage performance. In other words, the server may attempt to not re-tier more objects than necessary. To perform such a tailored re-tiering, the server may perform a determination (or heuristic) to select an appropriate threshold time used as the basis for re-tiering objects. In some embodiments, the server may prioritize re-tiering the oldest data first, and accordingly, select the earliest (e.g. oldest) threshold time possible that reestablishes adherence to the storage limit.

Continuing with the example of diagram 300, the server may select a threshold time for selecting candidate objects for re-tiering. As described, the threshold time may include any value (time, date, etc.) that references a point-in-time to delineate backups, and the objects referenced by such backups, for re-tiering. The threshold time may be selected based on the amount of storage that exceeds the storage limit. In some embodiments, the server may perform a calculation to determine that the selection of the threshold time will result in re-tiering a number of objects corresponding to the amount of storage that exceeds the storage limit. For example, the server may determine that re-tiering objects that are not referenced by backups after the first backup 310 may result in the appropriate amount of objects begin re-tiered to reestablish the required 40/60 ratio. Accordingly, the threshold time selected may delineate the first backup 310 from the second backup 320 and third backup 330. For example, the server may select the date of 2021 Mar. 20 as the threshold time. In other words, the selected threshold time falls between the first backup 310 and the second backup 320. As a result, the threshold time delineates backups, and corresponding objects, that were initially stored before and after 2021 Mar. 20.

To determine the appropriate threshold time, the server may perform a processing that leverages the stored metadata. For example, the determination may include the server accessing the metadata database 160. For example, the server may query the metadata database 160 and based on the corresponding backup times 353, identify (determine, retrieve, etc.) which backups are before the threshold time, and which backups are after the threshold time. In this example, the server determines that the first backup 310 was performed on 2021 Mar. 15, which is before the threshold time of 2021 Mar. 20, and determines that the second backup 320 was performed on 2021 Mar. 22, and the third backup 330 was performed on 2021 Mar. 29, which are both after threshold time of 2021 Mar. 20.

After categorizing the backups, the server may determine which objects each backup references. For example, the server may retrieve entry 381 which is associated with the first backup 310 to determine that the first backup 310 references objects 1, 2, and 3 based on the associated referenced object list 354. The server may then merge (or combine) the objects referenced by the backups performed before the threshold time. In this example, only one backup was performed before the threshold time and thus the merging of referenced objects lists may be skipped, or the merging results in the same list. Specifically, the server may store objects 1, 2, and 3 as part of a first list (e.g. list of objects referenced before the threshold time).

Similarly, the server may retrieve entries 382 and 383, which are associated with the second backup 320 and third backup 330 respectively, and determine that the second backup 320 references objects 1, 3, and 4, and the third backup 330 references object 1, 4, and 5 based on their respective referenced object lists 354. The server may then merge (or combine) the objects referenced by the second backup 320 and third backup 330 to create a second list (e.g. list of objects referenced after the threshold time). For example, the second list would include objects 1, 3, 4, and 5. Based on these two lists, the server may determine which objects may be re-tiered. Specifically, the server may determine which objects of the first list (e.g. objects 1, 2, and 3) are not included as part of the second list (e.g. objects 1, 3, 4, and 5). Accordingly, in this example, the server determines that object 2 (e.g. object 155B) is an object of the first list that is not included in (or part of) the second list. Thus, the server determines that object 2 is not referenced by either of the second backup 320 or the third backup 330. Thus, the server may identify (or select) object 2 for re-tiering. Thus, the server may initiate a process to move object 2 to a lower cost storage tier. As described, in this example, the server determined that re-tiering one object (e.g. object 2) results in reestablishing the 40/60 storage ratio. However, it should be noted that the server may select any threshold time to satisfy any type of storage rule.

As a different example, the storage rule may include re-tiering objects after an amount of storage used by objects within the standard storage tier results in a storage cost exceeding a predefined storage cost limit. For example, the storage cost limit (or maximum) may include a preference for storage costs associated with the data stored on the default storage tier to be less than a certain amount. Accordingly, once the storage costs exceed the limit, data should be re-tiered to a lower cost storage. Again, using the example in diagram 300, prior to the first backup 310, the storage costs for the existing backup data stored on the default storage tier may be less than (e.g. within) the preferred storage cost limit. However, after the third backup 330, the storage costs may exceed the storage cost limit in response to adding new objects 4, and 5 (e.g. objects 155D, and 155E) to the default storage tier.

Accordingly, similar to the previous example, the server may determine an amount of data to re-tier such that the storage costs are reduced to an acceptable level. However, in this example, the server may determine that using the previous (e.g. first) threshold time (2021 Mar. 20) will not result in a sufficient amount of data being re-tiered for the required cost reduction. Accordingly, the server may use a different (e.g. second) threshold time. The server may perform a calculation to determine that the selection of such a threshold time will result in re-tiering the required number of objects to sufficiently reduce the storage costs. For example, the server may determine that re-tiering objects that are not referenced by backups after the second backup 320 may result in the appropriate amount of objects begin re-tiered. Accordingly, the threshold time selected may delineate the first backup 310 and second backup 320 from the third backup 330. For example, the server may select the date of 2021 Mar. 25 as the threshold time. In other words, the selected threshold time falls between the second backup 320 and the third backup 330. As a result, the threshold time delineates backups, and corresponding objects, that were initially stored before and after 2021-3-25.

After categorizing the backups, the server may determine which objects each backup references. For example, the server may retrieve entries 381, and 382, which are associated with the first backup 310, and the second backup 320 respectively. Thus, the server may determine that the first backup 310 references objects 1, 2, and 3, and the second backup 320 references objects 1, 3, and 4 based on their associated referenced object lists 354. The server may then merge (or combine) the objects referenced by these backups that were performed before the threshold time. Specifically, the server may store objects 1, 2, 3, and 4 as part of a first list (e.g. list of objects referenced before the threshold time).

Similarly, the server may retrieve entry 383 which is associated with the third backup 330, and determine that the third backup 330 references objects 1, 4, and 5 based on the referenced object list 354. The server may then create a second list (e.g. list of objects referenced after the threshold time). For example, the second list would include objects 1, 4, and 5. Based on these two lists, the server may determine which objects may be re-tiered. Specifically, the server may determine which objects of the first list (e.g. objects 1, 2, 3, and 4) are not included as part of the second list (e.g. objects 1, 4, and 5). Accordingly, in this example, the server determines that objects 2, and 3 (e.g. objects 155B, and 155C) of the first list are not included in (or part of) the second list. Thus, the server determines that objects 2, and 3 are not referenced by the third backup 330. Thus, the server may identify (or select) objects 2, and 3 for re-tiering. Thus, the server may initiate a process to move objects 2, and 3 to a lower cost storage tier. As described, in this example, the server determined that re-tiering two objects (e.g. objects 2, and 3) results in reducing the storage costs to an acceptable level according to the storage rules.

It should be noted that the above describes a simplified example, and that the same re-tiering process may be applied to a larger number of objects or data scale (e.g. GBs, or TBs of data).

In addition, with respect to the metadata, the server may copy or create a new instance of the metadata database 160 from the previous backup and update the entries as necessary. Accordingly, each backup (e.g. full or incremental) may be associated with a particular version or instance of the metadata database 160. Alternatively, during each backup (e.g. full or incremental), the server may add entries (e.g. cumulatively) to a single instance of the metadata database 160. It should also be noted that the metadata database 160 may include one or more data structures (e.g. tables) that are linked together. Accordingly, a reference to the metadata database 160 (or instance thereof) may include a particular table (e.g. backup catalog) stored as part of the metadata database 160. It should also be noted that although not shown, the metadata database 160 may also store information associated with the backed-up client data. For example, the metadata database 160 may also store a data catalog (or index, table, etc.) storing information (e.g. an entry) associated with each backed-up email. For example, metadata database 160 may store various types of information such as the object in which each email is stored, the size of each email, properties associated with each email, and other types of information. Accordingly, the backup catalog information discussed above may also be derived from such a data catalog.

FIG. 4 is a flow diagram illustrating an example method of re-tiering objects within an object storage according to one or more embodiments of the disclosure. Process 400 may use processing logic, which may include software, hardware, or a combination thereof. For example, process 400 may be performed by a system including one or more components described in operating environment 100 (e.g. server 120, data manager 175, etc.).

In 401, the system (e.g. server 120) may perform a set of backups of client data stored on a client device (e.g. client device 110) to a cloud-based object storage (e.g. object storage 150). The set of backups (e.g. backups 310, 320, and 330) may include full and incremental backups of the client data. The backups of the client data may be stored as objects (e.g. objects 155) within a first (or default) storage tier (e.g. storage tier 1 151) of the object storage.

In 402, the system may store, as part of a metadata database (e.g. metadata database 160), a point-in-time (e.g. backup time 352) for each backup of the set of backups, and a list of objects (e.g. referenced object list 354) referenced by each backup of the set of backups. In some embodiments, the list of objects referenced may include the objects required to perform a full restore to the point-in-time of the corresponding backup.

In 403, the system may detect that an amount of storage used by the objects within the first storage tier exceeds a storage limit. For example, with reference to diagram 300, the system may determine that the amount of data stored by objects 1-5, which are stored in the first storage tier, exceeds the storage limit.

In some embodiments, the system may initiate detection of whether the amount of data stored on the first storage tier exceeds a storage limit based on various conditions. For example, the system may perform the detection after each backup. As another example, the system may perform the detection after a certain amount of data is backed-up. For instance, the system may perform the detection after 10 GBs of data is backed-up. In other words, the system may perform a re-tiering of data at 10 GB intervals. As yet another example, the system may perform the detection based on an amount of time (e.g. daily), or after a certain number of backups are performed (e.g. after every 5 backups). This may also include determining a number of a particular type of backups such as performing the detection after every 5 incremental backups.

In some embodiments, detecting the amount of storage used by the objects within the first storage tier exceeds the storage limit may include detecting the amount of storage used by the objects within the first storage tier exceeds, as the storage limit, a predetermined storage allocation for an amount of the client data stored within the first storage tier relative to an amount of the client data stored within a second storage tier. For example, as described with reference diagram 300, the system may ensure a certain storage ratio is maintained between the first storage tier and a second (or lower) storage tier (e.g. 40/60 storage ratio).

In some embodiments, detecting the amount of storage used by the objects within the first storage tier exceeds the storage limit may include detecting a storage cost associated with the amount of storage used by the objects within the first storage tier, and recognizing the determined storage cost exceeds, as the storage limit, a predetermined storage cost limit. For example, after storing a certain amount of data on the first storage tier, the associated storage costs may exceed a preferred storage cost limit, and accordingly, the system may initiate a re-tiering of data to reduce such costs to be within the preferred storage cost limit.

In 404, the system may determine a number of the objects to re-tier to a second storage tier (e.g. storage tier 2 152) based on the amount of storage that exceeds the storage limit. Continuing with the example of diagram 300, the system may determine the amount of storage that exceeds the storage limit corresponds to (or approximately corresponds to) the amount of data stored by two objects. For example, with reference to diagram 300, the amount of storage that exceeds the limit may be 8 MB, which is approximately the amount of data storage by two objects (e.g. at 4 MB each). In some embodiments, the objects stored by the object storage may be substantially the same (or consistent) size. However, in some embodiments, the objects may be of different sizes and the system may account for such differences. For example, the system may approximate the number of objects required to be re-tiered based on an average size of the objects.

In 405, the system may select a threshold time based on the number of the objects to re-tier. In some embodiments, the threshold time may specify a point-in-time for delineating backups such that objects not referenced by backups performed on or after the point-in-time may be re-tiered. As described with the example of diagram 300, the system may select 2021-3-25 as the threshold time to delineate the third backup 330 from the first backup 310 and the second backup 320. In other words, the system may perform an approximate calculation to determine that using such a threshold time may result in the re-tiering of approximately the determined number of objects to re-tier.

Alternatively, or in addition to, performing a calculation based on the number of objects to re-tier, the system may select a threshold time based on the most recent backup. For example, selecting the threshold time may include determining, amongst the set of backups, a most recent backup, and selecting a time that corresponds to the most recent backup.

In 406, the system may identify, amongst the objects stored by the object storage, a first set of objects not referenced by a first set of backups, amongst the set of backups, performed on or after the threshold time. Continuing with the example of diagram 300, objects 2, and 3 (e.g. the first set of objects) are not referenced by the third backup 330 (e.g. first set of backups) performed on 2021 Feb. 29, which is after the threshold time (e.g. 2021 Mar. 25).

In some embodiments, identifying the first set of objects may include obtaining the lists of objects referenced by backups performed before and on or after the threshold time (e.g. 2021 Mar. 25), and determining, based on the obtained lists, the objects not referenced by backups performed on or after the threshold. For example, in some embodiments, identifying the first set of objects may include identifying, amongst the set of backups, the first set of backups performed on or after the threshold time (e.g. third backup 330), and a second set of backups performed before the threshold time (e.g. first backup 310 and second backup 320), identifying, amongst the objects stored by the object storage, a second set of objects (e.g. objects 1, 4, and 5) referenced by the first set of backups, and a third set of objects (e.g. objects 1, 2, 3, 4, and 5) referenced by the second set of backups, and identifying, amongst the third set of objects, the first set of objects (e.g. objects 2, and 3) as the objects not included in the second set of objects. For example, based on the obtained list of objects referenced, the system may determine that objects 2, and 3 are not part of the list of objects 1, 4, and 5, which are the objects required to perform a full restore of the third backup 330. Accordingly, objects 2, and 3 may be re-tiered.

In some embodiments, identifying the first set of backups and the second set of backups may include retrieving, from the metadata database, the point-in-time for each backup of the first set of backups, and the point-in-time for each backup of the second set of backups. Accordingly, identifying the first set of backups and the second set of backups may also include identifying the point-in-time for each backup of the first set of backups is on or after the threshold time, and the point-in-time for each backup of the second set of backups is before the threshold time.

In addition, identifying the first set of objects and the second set of objects may include retrieving, from the metadata database, the objects (e.g. the list of objects) required to perform the full restore to the point-in-time for each backup of the first set of backups, and the objects (e.g. the list of objects) required to perform the full restore to the point-in-time for each backup of the second set of backups. Accordingly, identifying the first set of objects and the second set of objects may also include identifying the first set of objects by merging the objects required to perform the full restore to the point-in-time for each backup of the first set of backups, and the second set of objects by merging the objects required to perform the full restore to the point-in-time for each backup of the second set of backups.

In some embodiments, selecting the threshold time may include determining an approximate amount of storage used by a first set of objects corresponds to the amount of storage that exceeds the storage limit. For example, with reference to diagram 300, the system may select 2021-3-25 as the threshold time based on a determination that the amount of data stored by objects 2, and 3 corresponds to (e.g. equals or is greater than) the amount of data that exceeds the storage limit. Accordingly, in such an example, the re-tiering of objects 2, and 3 results in the amount of data stored on the first storage tier once again being within the storage limit.

In some embodiments, operation 406 may be performed as part of, or in conjunction with, operation 405. For example, the system may iterate through various threshold times until the storage amount of the objects selected for re-tiering (e.g. unreferenced objects) corresponds to the amount of storage that exceeds the predefined limit. For example, the storage amount that corresponds to the amount of storage that exceeds the predefined limit may be an amount of data that approximately matches the amount of storage that exceeds the predefined limit. In some embodiments, approximately matching may include an amount of data that is greater (or slightly greater) than or equal to the amount of data that exceeds the limit.

In 407, the system may initiate a re-tiering by moving the first set of objects from the first storage tier to the second storage tier of the object storage. For example, as a result of the re-tiering, the system returns the amount of data stored on the first storage tier to an acceptable level according to one or more storage rules (or conditions).

Accordingly, in some embodiments, the method may allow for the intelligent re-tiering of backup data stored on a cloud-based object storage.

Figure 5:
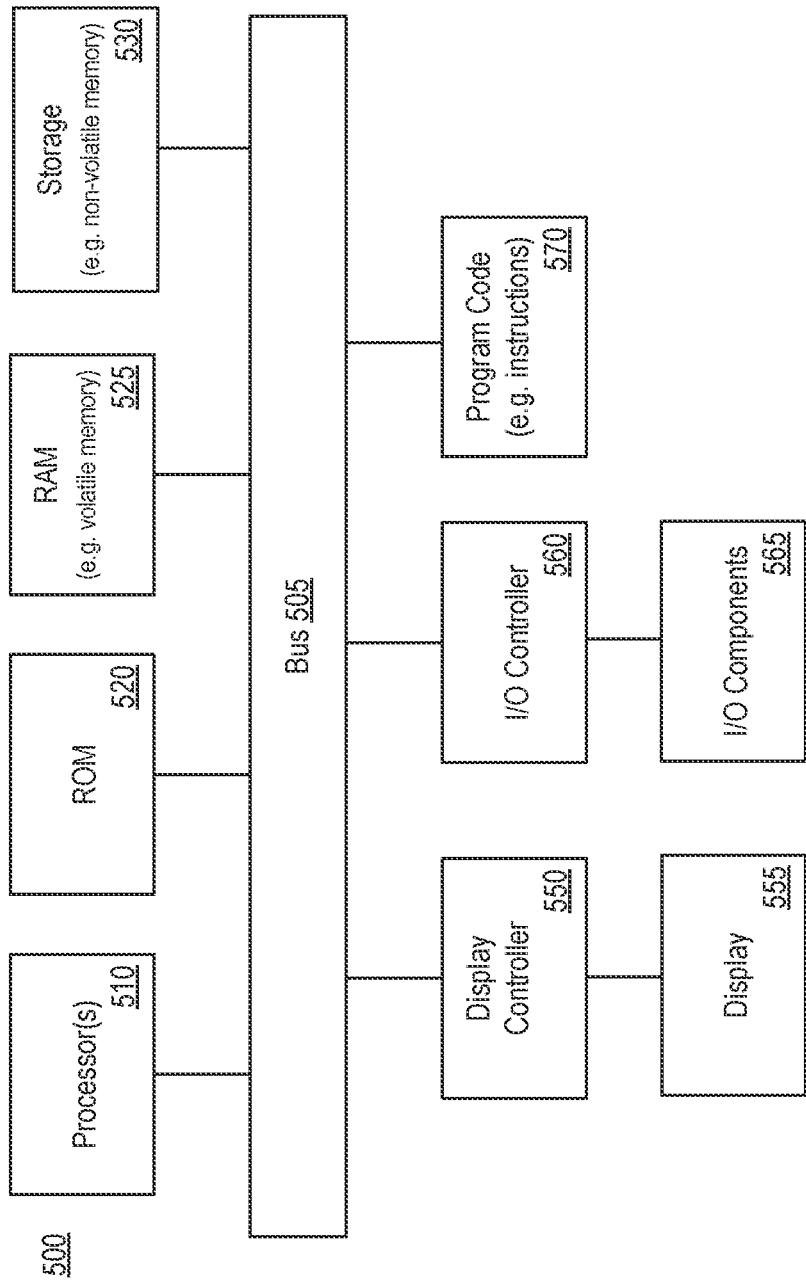
FIG. 5 is a block diagram illustrating an example of a computing system that may be used in conjunction with one or more embodiments of the disclosure.

FIG. 5 shows a block diagram of an example of a computing system that may be used in conjunction with one or more embodiments of the disclosure. For example, computing system 500 (or system, or server, or computing device, or device) may represent any of the devices or systems (e.g. server 120, client device 110, object storage 150, etc.) described herein that perform any of the processes, operations, or methods of the disclosure. Note that while the computing system 500 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 500 may include a bus 505 which may be coupled to a processor 510, ROM (Read Only Memory) 520, RAM (or volatile memory) 525, and storage (or non-volatile memory) 530. The processor(s) 510 may retrieve stored instructions from one or more of the memories 520, 525, and 530 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 510 may perform operations in an on-demand or "cloud computing" environment or as a service (e.g. within a "software as a service" (SaaS) implementation). Accordingly, the performance of operations may be distributed among the one or more processors 510, whether residing only within a single machine or deployed across a number of machines. For example, the one or more processors 510 may be located in a single geographic location (e.g. within a home environment, an office environment, or a server farm), or may be distributed across a number of geographic locations. The RAM 525 may be implemented as, for example, dynamic RAM (DRAM), or other types of memory that require power continually in order to refresh or maintain the data in the memory. Storage 530 may include, for example, magnetic, semiconductor, tape, optical, removable, non-removable, and other types of storage that maintain data even after power is removed from the system. It should be appreciated that storage 530 may be remote from the system (e.g. accessible via a network).

A display controller 550 may be coupled to the bus 505 in order to receive display data to be displayed on a display device 555, which can display any one of the user interface features or embodiments described herein and may be a local or a remote display device. The computing system 500 may also include one or more input/output (I/O) components 565 including mice, keyboards, touch screen, network interfaces, printers, speakers, and other devices. Typically, the input/output components 565 are coupled to the system through an input/output controller 560.

Program code 570 may represent any of the instructions, applications, software, libraries, toolkits, modules, components, engines, units, functions, logic, etc. as described herein (e.g. server 120, data manager 175, rules engine 177, etc.). Program code 570 may reside, completely or at least partially, within the memories described herein (e.g. non-transitory computer-readable media), or within a processor during execution thereof by the computing system. Program code 570 may include both machine code, such as produced by a compiler, and files containing higher-level or intermediate code that may be executed by a computing system or other data processing apparatus (or machine) using an interpreter. In addition, program code 570 can be implemented as software, firmware, or functional circuitry within the computing system, or as combinations thereof. Program code 570 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer-readable medium storing a plurality of instructions, which when executed, cause the one or more processors to:
   perform, by a server, a set of backups of client data stored on a client device to a cloud-based object storage, the set of backups of the client data stored as objects within a first storage tier of the object storage;
   detect that an amount of storage used by the objects within the first storage tier exceeds a storage limit;
   determine a number of the objects to re-tier to a second storage tier of the object storage based on the amount of storage that exceeds the storage limit;
   select a threshold time based on the number of the objects to re-tier;
   identify, amongst the objects stored by the object storage, a first set of objects not referenced by a first set of backups, amongst the set of backups, performed on or after the threshold time; and
   initiate a re-tiering by moving the first set of objects from the first storage tier to the second storage tier of the object storage.

2. The system of claim 1, wherein the plurality of instructions, when executed, further cause the one or more processors to:
   store, as part of a metadata database, a point-in-time for each backup of the set of backups, and a list of objects referenced by each backup of the set of backups, the list of objects referenced specifying the objects required to perform a full restore to the point-in-time of the corresponding backup.

3. The system of claim 1, wherein the selecting the threshold time includes determining an approximate amount of storage used by the first set of objects corresponds to the amount of storage that exceeds the storage limit.

4. The system of claim 1, wherein the detecting that the amount of storage used by the objects within the first storage tier exceeds the storage limit includes:
 detecting the amount of storage used by the objects within the first storage tier exceeds, as the storage limit, a predetermined storage allocation for an amount of the client data stored within the first storage tier relative to an amount of the client data stored within the second storage tier.

5. The system of claim 1, wherein the detecting that the amount of storage used by the objects within the first storage tier exceeds the storage limit includes:
 detecting a storage cost associated with the amount of storage used by the objects within the first storage tier; and
 recognizing the determined storage cost exceeds, as the storage limit, a predetermined storage cost limit.

6. The system of claim 1, wherein the identifying the first set of objects includes:
 identifying, amongst the set of backups, the first set of backups performed on or after the threshold time, and a second set of backups performed before the threshold time;
 identifying, amongst the objects stored by the object storage, a second set of objects referenced by the first set of backups, and a third set of objects referenced by the second set of backups; and
 identifying, amongst the third set of objects, the first set of objects as the objects not included in the second set of objects.

7. The system of claim 1, wherein the selecting the threshold time further includes:
 determining, amongst the set of backups, a most recent backup; and
 selecting a time that corresponds to the most recent backup as the threshold time.

8. The system of claim 1, wherein the set of backups include full and incremental backups of the client data.

9. A method comprising:
 performing, by a server, a set of backups of client data stored on a client device to a cloud-based object storage, the set of backups of the client data stored as objects within a first storage tier of the object storage;
 detecting that an amount of storage used by the objects within the first storage tier exceeds a storage limit;
 determining a number of the objects to re-tier to a second storage tier of the object storage based on the amount of storage that exceeds the storage limit;
 selecting a threshold time based on the number of the objects to re-tier;
 identifying, amongst the objects stored by the object storage, a first set of objects not referenced by a first set of backups, amongst the set of backups, performed on or after the threshold time; and
 initiating a re-tiering by moving the first set of objects from the first storage tier to the second storage tier of the object storage.

10. The method of claim 9, further comprising:
 storing, as part of a metadata database, a point-in-time for each backup of the set of backups, and a list of objects referenced by each backup of the set of backups, the list of objects referenced specifying the objects required to perform a full restore to the point-in-time of the corresponding backup.

11. The method of claim 9, wherein the selecting the threshold time includes determining an approximate amount of storage used by the first set of objects corresponds to the amount of storage that exceeds the storage limit.

12. The method of claim 9, wherein the detecting that the amount of storage used by the objects within the first storage tier exceeds the storage limit includes:
 detecting the amount of storage used by the objects within the first storage tier exceeds, as the storage limit, a predetermined storage allocation for an amount of the client data stored within the first storage tier relative to an amount of the client data stored within the second storage tier.

13. The method of claim 9, wherein the detecting that the amount of storage used by the objects within the first storage tier exceeds the storage limit includes:
 detecting a storage cost associated with the amount of storage used by the objects within the first storage tier; and
 recognizing the determined storage cost exceeds, as the storage limit, a predetermined storage cost limit.

14. The method of claim 9, wherein the identifying the first set of objects includes:
 identifying, amongst the set of backups, the first set of backups performed on or after the threshold time, and a second set of backups performed before the threshold time;
 identifying, amongst the objects stored by the object storage, a second set of objects referenced by the first set of backups, and a third set of objects referenced by the second set of backups; and
 identifying, amongst the third set of objects, the first set of objects as the objects not included in the second set of objects.

15. A computer program product comprising a non-transitory computer-readable medium having a computer-readable program code embodied therein to be executed by one or more processors, the program code including instructions to:
 perform, by a server, a set of backups of client data stored on a client device to a cloud-based object storage, the set of backups of the client data stored as objects within a first storage tier of the object storage;
 detect that an amount of storage used by the objects within the first storage tier exceeds a storage limit;
 determine a number of the objects to re-tier to a second storage tier of the object storage based on the amount of storage that exceeds the storage limit;
 select a threshold time based on the number of the objects to re-tier;
 identify, amongst the objects stored by the object storage, a first set of objects not referenced by a first set of backups, amongst the set of backups, performed on or after the threshold time; and
 initiate a re-tiering by moving the first set of objects from the first storage tier to the second storage tier of the object storage.

16. The computer program product of claim 15, wherein the program code includes further instructions to:
 store, as part of a metadata database, a point-in-time for each backup of the set of backups, and a list of objects referenced by each backup of the set of backups, the list of objects referenced specifying the objects required to perform a full restore to the point-in-time of the corresponding backup.

17. The computer program product of claim 15, wherein the selecting the threshold time includes determining an approximate amount of storage used by the first set of objects corresponds to the amount of storage that exceeds the storage limit.

18. The computer program product of claim 15, wherein the detecting that the amount of storage used by the objects within the first storage tier exceeds the storage limit includes:
   detecting the amount of storage used by the objects within the first storage tier exceeds, as the storage limit, a predetermined storage allocation for an amount of the client data stored within the first storage tier relative to an amount of the client data stored within the second storage tier.

19. The computer program product of claim 15, wherein the detecting that the amount of storage used by the objects within the first storage tier exceeds the storage limit includes:
   detecting a storage cost associated with the amount of storage used by the objects within the first storage tier; and
   recognizing the determined storage cost exceeds, as the storage limit, a predetermined storage cost limit.

20. The computer program product of claim 15, wherein the identifying the first set of objects includes:
   identifying, amongst the set of backups, the first set of backups performed on or after the threshold time, and a second set of backups performed before the threshold time;
   identifying, amongst the objects stored by the object storage, a second set of objects referenced by the first set of backups, and a third set of objects referenced by the second set of backups; and
   identifying, amongst the third set of objects, the first set of objects as the objects not included in the second set of objects.

* * * * *